(12) United States Patent
Zadro

(10) Patent No.: US 8,905,560 B1
(45) Date of Patent: Dec. 9, 2014

(54) ADJUSTABLE ORIENTATION ANGLE MULTIPLE SUCTION CUP MOUNTABLE SPOT MIRROR

(76) Inventor: Zlatko Zadro, Huntington Beach, CA (US)

(*) Notice: Subject to any disclaimer, the term of this patent is extended or adjusted under 35 U.S.C. 154(b) by 416 days.

(21) Appl. No.: 13/136,395

(22) Filed: Aug. 1, 2011

(51) Int. Cl.
G02B 7/182 (2006.01)
A47F 1/14 (2006.01)
A47G 1/16 (2006.01)
B60R 1/02 (2006.01)

(52) U.S. Cl.
USPC .......................................... 359/876; 248/467

(58) Field of Classification Search
USPC ............. 248/467; 40/597; 359/850, 870–871, 359/876; D6/309
See application file for complete search history.

(56) References Cited

U.S. PATENT DOCUMENTS

| | | | | |
|---|---|---|---|---|
| 2,091,203 A | * | 8/1937 | Hay | 248/467 |
| 3,708,218 A | * | 1/1973 | Smillie, III | 359/512 |
| 4,848,542 A | * | 7/1989 | Burnette et al. | 206/765 |
| 4,950,065 A | * | 8/1990 | Wyman | 359/871 |
| 5,900,996 A | * | 5/1999 | Zadro | 359/846 |
| D465,933 S | * | 11/2002 | Henderson et al. | D6/309 |
| D562,571 S | * | 2/2008 | Pitot | D6/309 |
| D658,899 S | * | 5/2012 | Zadro | D6/309 |

\* cited by examiner

*Primary Examiner* — Stephone B Allen
*Assistant Examiner* — Kimberly N Kakalec
(74) *Attorney, Agent, or Firm* — William L. Chapin

(57) ABSTRACT

A magnifying spot mirror releasably attachable to a flat surface includes a circular concave mirror plate mounted on the front surface of a lenticular-shaped support body which has a convex, arcuately curved rear surface from which protrude satellite suction cups that have circular bases which lie in a convex plane and are radially spaced equidistant from the center of the support body and an optional center suction cup. Applying finger pressure to the center of the mirror causes a pair of centrally located suction cups and/or the optional center cup to hermetically grip a flat surface with the mirror parallel to the surface. Pressing on the mirror at a location offset from the center exerts a tensional unsealing force on radially inwardly located suction cups, and compressional sealing forces on outer satellite suction cups, thus re-positioning the mirror at a different orientation angle.

26 Claims, 7 Drawing Sheets

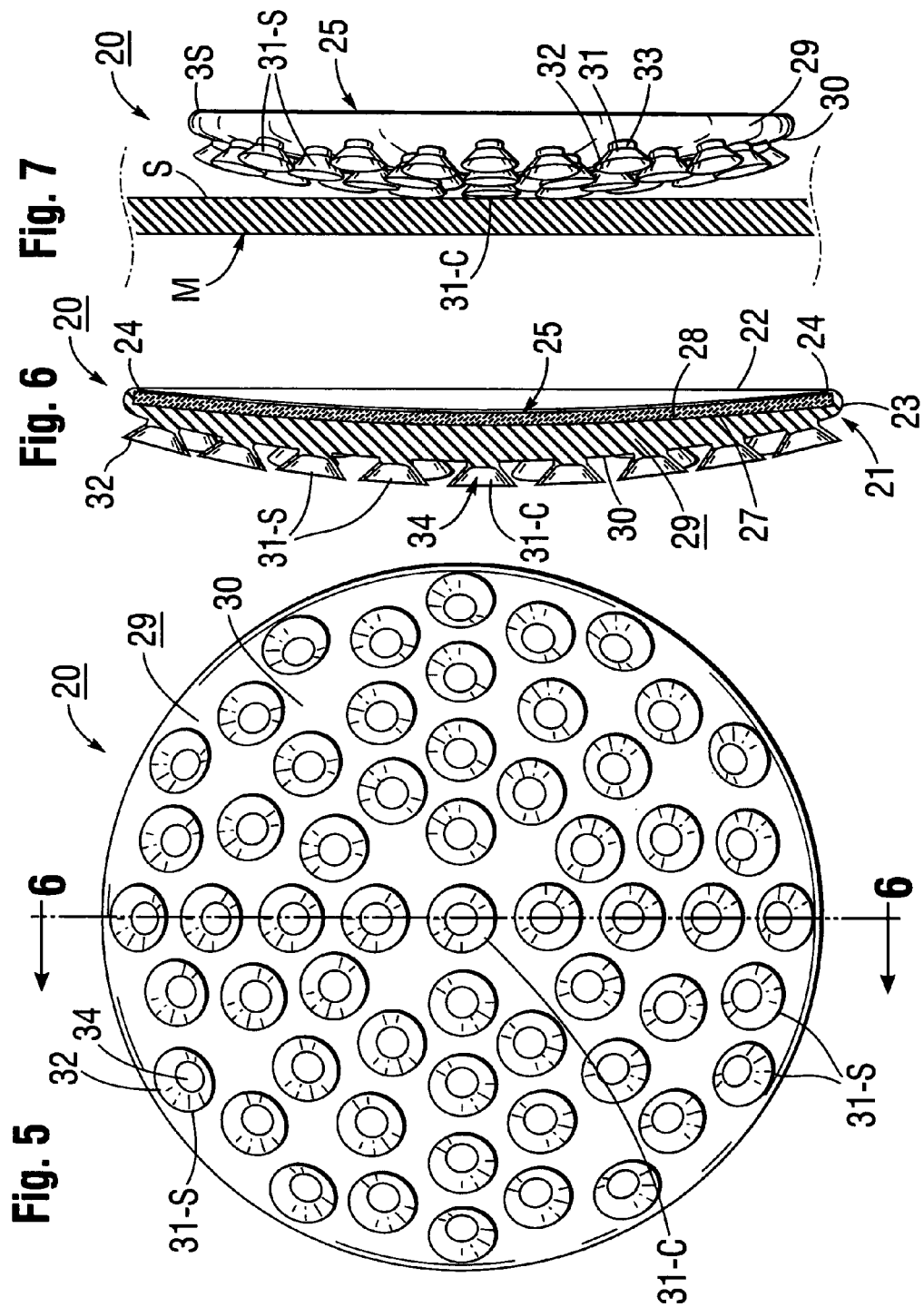

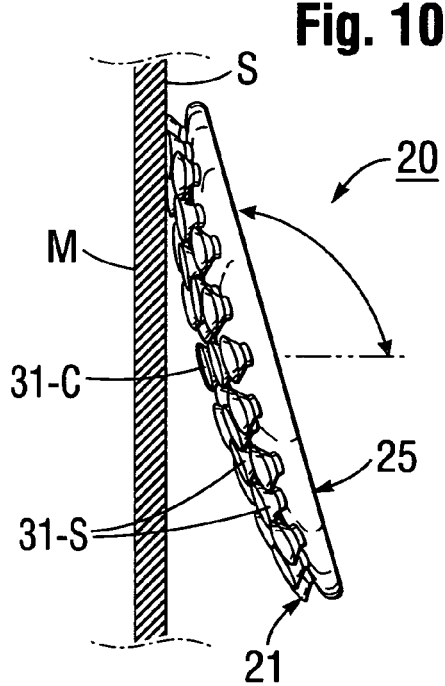
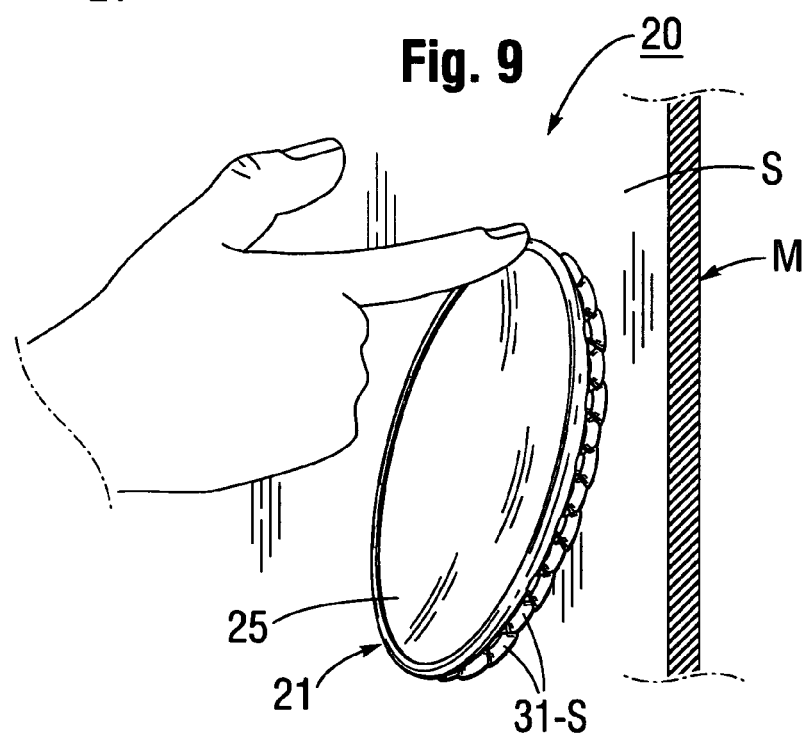

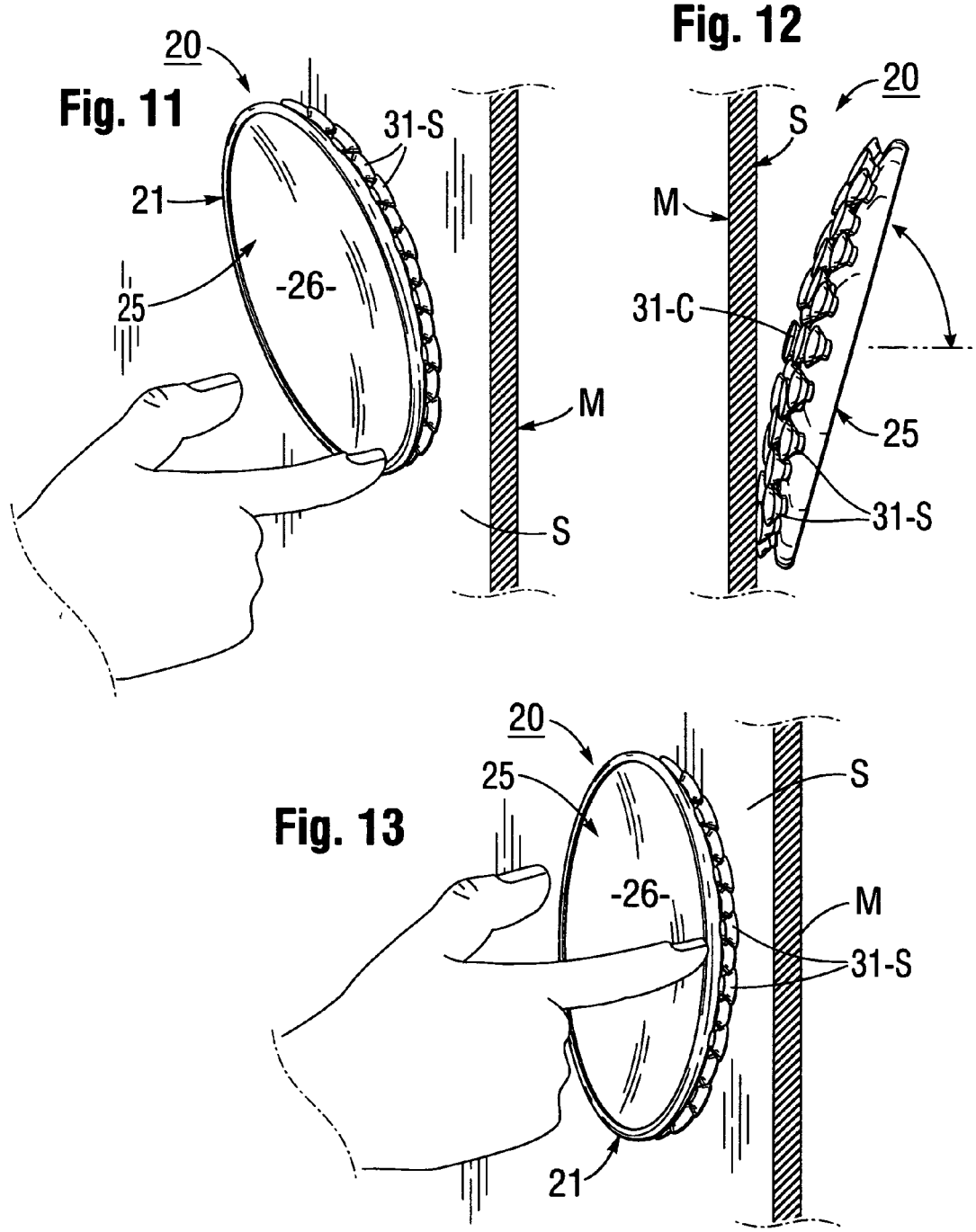

ADJUSTABLE ORIENTATION ANGLE MULTIPLE SUCTION CUP MOUNTABLE SPOT MIRROR

BACKGROUND OF THE INVENTION

A. Field of the Invention

The present invention relates to mirrors of the type used to facilitate performance of personal care functions such as shaving, applying cosmetics, and the like. More particularly, the invention relates to a novel mirror which includes a frame that is releasably attachable to a flat surface such as that of a larger flat mirror or shower wall, at adjustable inclination angles relative to the mounting surface.

B. Description of Background Art

Some aspects of a person's appearance are best attended to by observing his or her image in a relatively large "wide angle" mirror, which has unity or "1×" magnification, such as a full length wall mirror, a dresser mirror, or a bathroom mirror mounted on a wall or cabinet. On the other hand, certain personal grooming functions such as shaving, applying cosmetics and the like are generally more easily performed while viewing a larger image of one's face, which can be provided by positioning the face closer to a flat mirror.

In some circumstances, however, it is not convenient to position one's face sufficiently close to an existing flat mirror to provide an image of the face which is sufficiently large to enable a desired personal grooming task to be easily performed. In such situations, it would be desirable to have available a mirror having a magnification factor greater than one. Since available counter space in locations such as bathrooms is often at a premium, it would also be desirable to have available a magnifying mirror which is releasably and conveniently attachable to a vertical surface, such as that of an existing wall or cabinet-mounted mirror. Also, since a person's vision usually degrades with age, there is an accompanying need for a small, "spot" mirror which can be attached to an existing larger mirror to enable a person to see image details required to perform personal care functions. Accordingly, it would be desirable to provide an inexpensive magnifying spot mirror which is readily attachable to an existing household mirror or shower enclosure wall.

In response to a perceived need for a magnifying spot mirror which was attachable to a larger flat mirror, the present inventor disclosed in U.S. Pat. No. 6,854,852 a Dual Magnification Reversible Spot Mirror Releasably Attachable To Flat Surfaces. The mirror disclosed in the '852 patent has a frame which is pivotably mounted by a linear hinge to a bracket which is releasably attachable to a flat surface such as a vertical mirror by three suction cups that have co-planar seating surfaces. With this arrangement, the mirror frame, which removably holds a mirror plate having different magnifications on opposite sides thereof, can be tilted in a plane perpendicular to the axis of the linear hinge joint.

The present invention was conceived of to provide a spot mirror which could be releasably attachable to a flat mounting surface, such as a larger vertically oriented flat mirror, and be adjustable over a wide range of orientation angles relative to a mounting surface.

OBJECTS OF THE INVENTION

An object of the present invention is to provide a small mirror which is releasably attachable to a flat mounting surface such as the vertical surface of a larger flat mirror, at adjustable orientation angles relative to the mounting surface.

Another object of the invention is to provide a magnifying mirror which is releasably attachable to a larger mirror at adjustable orientation angles to thus provide magnified images of selectable portions of the field viewable in the larger mirror.

Another object of the invention is to provide an adjustable orientation angle spot mirror which is releasably attachable to a flat surface such as a larger flat, vertically oriented wall mirror, medicine cabinet mirror, or a to shower enclosure wall.

Another object of the invention is to provide an adjustable orientation angle spot mirror that is releasably attachable to a flat surface and adjustable in orientation angle relative to the surface by pressing on the front surface of the spot mirror at a location offset from the center of the mirror to thus tilt the mirror in the offset direction and thereby positioning different releasable fasteners on a rear surface of the mirror into contact with the flat surface.

Another object of the invention is to provide an adjustable orientation angle spot mirror that has protruding from a rear surface thereof a plurality of non-co-planar suction cups which enable the mirror to be releasably attached to a flat surface by pressing the planar surface of selected suction cups into flat compressive sealing contact with the flat support surface.

Another object of the invention is to provide an adjustable orientation angle spot mirror which has protruding from a rear surface thereof a plurality of non-co-planar suction cups arranged in sequence of concentric rings of increasing diameter which are coaxial with the mirror frame, thus enabling the mirror to be releasably attached to a flat surface such as the front vertical surface of a larger vertically oriented flat mirror by pressing rearwardly with a finger against the front surface of the spot mirror to thus compress selected suction cups into hermetically sealing compressive adherence to the flat surface, and re-adjusting the orientation angle of the spot mirror to tilt in a desired direction by pressing on the front of the mirror at a location offset in a desired tilt direction from the center of the mirror.

Various other objects and advantages of the present invention, and its most novel features, will become apparent to those skilled in the art by perusing the accompanying specification, drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention be limited to details of the embodiments described. I do intend that equivalents, adaptations and modifications of the invention reasonably inferable from the description contained herein be included within the scope of the invention as defined by the appended claims.

SUMMARY OF THE INVENTION

Briefly stated the present invention comprehends a magnifying spot mirror which is releasably attachable to a flat surface such as the front vertical surface of a larger wall mirror or bathroom cabinet mirror. According to the invention, the mirror has a circular frame which holds therein a circular mirror, which preferably has a concave reflecting surface and thus forms magnified images of objects in front of the mirror. The mirror frame is attached to the front surface of circular, lenticular-shaped support body which has an arcuately curved, convex rear surface.

The adjustable orientation angle spot mirror according to the present invention includes a multiplicity of identical suction cups which protrude from the convex rear surface of the support body and which are pressable against a flat surface to form a releasable hermetic suction seal which is effective in releasably supporting the spot mirror from the support surface.

According to the invention the flat annular sealing surfaces of the suction cups are non-co-planar with each other. In a preferred embodiment, the spot mirror has an array of 18 or more regularly spaced apart, frusto-conically shaped suction cups whose flat annular ring-shaped seating surfaces lie on a convex arcuately curved surface, such as a section of a sphere. Applying finger tip pressure to the center of the front surface of the mirror causes a central coaxially located suction cup to be pressed rearward against a support surface, releasably attaching the spot mirror to a support surface with the reflective surface of the spot mirror oriented parallel to the support surface.

Pressing rearward on the front surface of the spot mirror at a location offset from the center of the spot mirror causes a tensional parting force to be exerted on the center suction cup that has been hermetically sealed to the support surface, and a compressional seating force to be exerted on suction cups located directly behind the location of the front surface on which finger pressure is exerted. This tensional/compressional force couple causes the original suction cup seal to be pulled away and released from the support surface, and new suction cup seals to be formed by different suction cups at a location behind a spot where finger tip pressure has been exerted, thus releasably attaching the mirror at a new orientation angle relative to the mounting surface.

In a preferred embodiment of the invention, multiple concentric rows of suction cups which are coaxial with a centrally located suction cup are provided. This arrangement enables the spot mirror to be releasably attached to a flat surface and adjusted over a wide range of elevation and azimuth angles relative to the support surface, and to be releasably re-fastened at a new adjustable angle by merely pressing upon the front of the mirror at a location offset from the center of the mirror towards the new desired orientation. In a modification of the preferred embodiment, the central suction cup is eliminated, and the mirror adhered in parallel to a flat surface by one or more pairs of resilient suction cups located equidistant from the center of the mirror.

BRIEF DESCRIPTION OF THE DRAWINGS

FIG. 5 is a rear elevation view of the mirror of FIG. 1, on an enlarged scale.

FIG. 6 is a longitudinal sectional view of the mirror of FIG. 5, taken in the direction of the line 6-6.

FIG. 7 is a side elevation view of the mirror of FIG. 1, showing the mirror removably attached in a vertical orientation parallel to a flat vertical surface.

FIG. 9 is a perspective view showing the mirror of FIG. 1 tilted to an upward orientation angle by pressing on an upper part of the mirror frame with a fingertip.

FIG. 10 is a side elevation view of the mirror of FIG. 9.

FIG. 11 is a perspective view showing the mirror of FIG. 1 tilted downwardly to a downwardly angled orientation by a fingertip.

FIG. 12 is a side elevation view of the mirror of FIG. 11.

FIG. 13 is a perspective view of the mirror of FIG. 1 being tilted to a rightwardly angled orientation by finger pressure applied to the right side of the mirror frame.

DESCRIPTION OF THE PREFERRED EMBODIMENT

Figure 1:
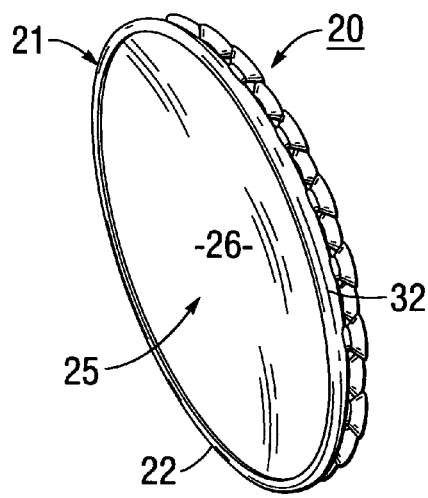
FIG. 1 is a perspective view of an adjustable orientation angle multiple suction cup-mountable spot mirror according to the present invention.
Figure 2:
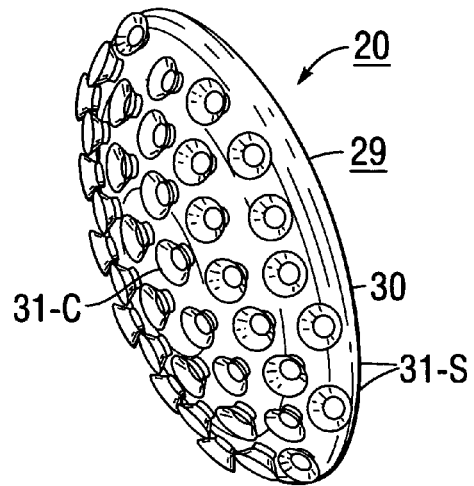
FIG. 2 is a rear perspective view of the mirror of FIG. 1.

FIGS. 1-14 illustrate a preferred embodiment of an adjustable orientation angle multiple suction cup-mountable mirror according to the present invention.

Referring to FIGS. 1-5, an adjustable orientation angle suction cup-mountable spot mirror 20 according to the present invention is shown to include a circular frame 21 which is circumscribed by a peripheral annular ring-shaped bezel ring 22. Bezel ring 22 has an outer longitudinally disposed side wall 23 which has a peripheral flange 24 that protrudes perpendicularly and radially inwardly therefrom to retain therebehind a reflective mirror 25.

As shown in FIG. 6, mirror 25 has a forward facing reflective surface 26, and a rear surface 27 which is seated on the front surface 28 of a body 29 of frame 21. In the preferred embodiment, reflective surface 26 of mirror 25 is rearwardly or inwardly concave, thus providing magnified images of objects located in front of the mirror.

Figure 3:
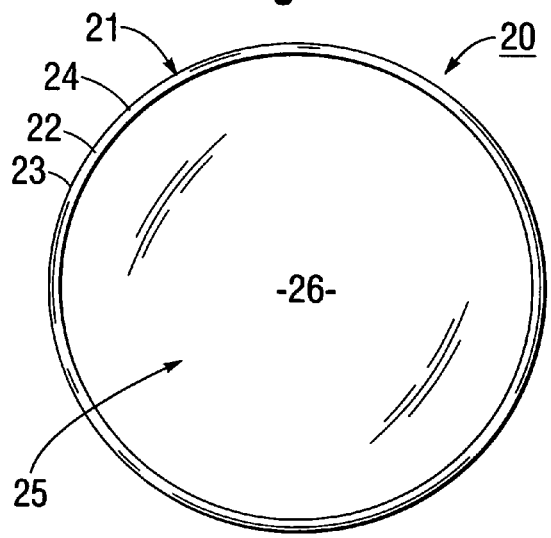
FIG. 3 is a front elevation view of the mirror of FIG. 1
Figure 4:
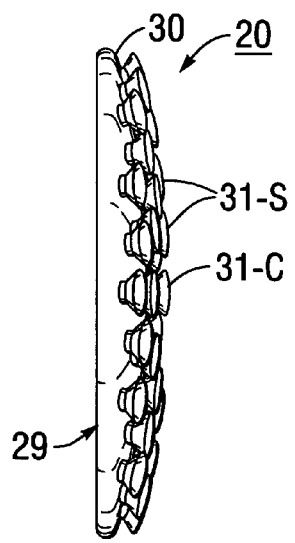
FIG. 4 is a side elevation view of the mirror of FIG. 1

As shown in FIG. 3, spot mirror 20 preferably has a circular shape, but could optionally be oval or rectangular.

As shown in FIGS. 3 and 6, frame 21 and mirror 25 of spot mirror 20 are mounted concentrically to the front surface of a circular, lenticular-shaped support body 29.

As may be seen best by referring to FIGS. 2 and 4-6, lenticular-shaped support body 29 of spot mirror 20 includes a flat or preferably slightly concave, circularly-shaped front surface 28, and a convex, arcuately curved rear surface 30. Although the exact contour of rear surface 30 of support body 29 is not critical, in an example embodiment of mirror 20 the rear surface had generally the shape of a spherical section.

As may be seen best by referring to FIGS. 5 and 6, mirror 20 includes a plurality of suction cups 31 which protrude rearwardly from rear arcuately curved convex surface 30 of mirror frame body 29. As shown in FIG. 6, each suction cup 31 has a hollow generally frusto-conic shape which includes a rear flat, annular ring-shaped base 32 and a front circular cross-section stem 33 of smaller diameter than the base.

Each suction cup 31 is made of a soft elastomeric material such as a silicone rubber, and is releasably conformable to a flat surface by exerting a compressive pressure between the ring-shaped base of the suction cup and a mounting surface to expel air from the frusto-conically shaped hollow interior space 34 of the suction cup. Expelling air from the hollow interior space 34 of suction cup 31 produces a partial vacuum therewithin and since the base 32 of the suction cup is elastically deformable and thereby conformable to a flat surface to form a hermetic seal, a pressure differential between atmospheric pressure exterior to suction cup 31 and a partially evacuated interior space 34 of the suction cup results in a compressive force being exerted by the base ring 32 of the suction cup on a flat surface, thus releasably fastening the suction cup to the surface.

Referring to FIG. 6, it may be seen that suction cups 31 which protrude from the convex arcuately curved rear surface 30 of mirror frame body 29 include a centrally located suction cup 31-C, and a plurality of satellite suction cups 31-S which are located at spaced apart positions between the central suction cup and the outer peripheral edge 35 of the frame body.

For a purpose which will be described in detail below, spot mirror 20 is provided with multiple satellite suction cups 31-S so that the mirror can be releasably attached at multiple adjustable orientation angles to a flat mounting surface such as a larger, vertically disposed flat mirror, shower enclosure wall, or the like. Therefore, the location and number of satellite suction cups depends upon the desired number and directions of orientation angles which the mirror is intended to provide.

In an example embodiment of mirror 20, satellite suction cups 31-S were arranged along 4 regularly spaced apart straight lines of suction cups spaced along 4 radii extending up, down, left and right from center suction cup 31-C, for a total of 16 axially arranged satellite suction cups 31-S, and an additional 10 satellite suction cups 31-S located in each quadrant of the circularly-shaped rear surface of mirror frame body 29 for a total of 56 satellite suction cups 31-S spaced radially apart from central suction cup 31-C.

Figure 8:
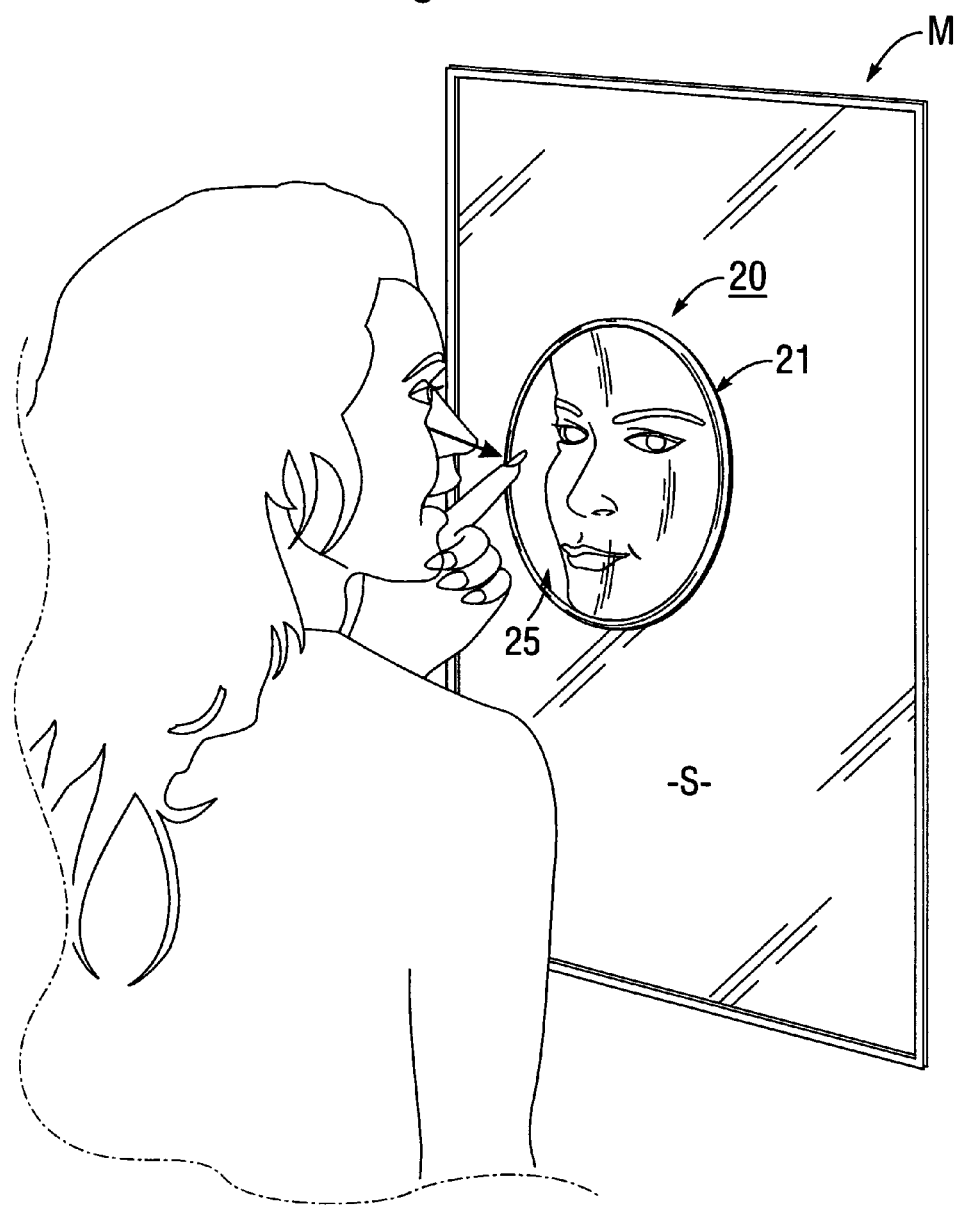
FIG. 8 is a front perspective view of the mirror orientated as shown in FIG. 7.

The manner of using spot mirror 20 may be best understood by referring to FIGS. 7-14. As shown in FIG. 7, mirror 20 is releasably attachable to a flat surface such as the front surface S of a vertical mirror M, by applying finger pressure to the front surface 26 of mirror 25. If pressure is applied to the center of front mirror surface 26, the center suction cup 31-C will form a hermetic seal with surface S, and thus releasably attach mirror 20 to the surface with the mirror in parallel alignment with the surface. FIG. 8 is a perspective view showing spot mirror 20 releasably attached in parallel alignment to the surface S of a larger flat mirror M.

FIG. 9 illustrates how spot mirror 20 may be re-oriented from parallel alignment with the vertical surface S of a mirror M or other such supporting surface. As shown in FIG. 9 spot mirror 20 is adjusted to a different orientation angle by applying finger pressure to a location of the front surface 26 of mirror 25, as for example on bezel ring 22 of mirror 25, which is offset in an upward direction from the center of the mirror. As can be envisioned by referring to FIGS. 7 and 10, since the bases 32 of satellite suction cups 31-S are located on a convex arcuately curved surface 37 which is parallel to convex rear surface 30 of mirror frame body 29, those bases are spaced forward away from mounting surface S. Therefore, applying a rearwardly directed force on front surface 26 of mirror at any location radially offset from center suction cup 31-C results in tensional parting force being exerted on the center suction cup which releases the central suction cup from hermetic sealing contact with the mounting surface, and a compressive adhering force being exerted by satellite suction cups 31-S longitudinally aligned with the offset force, thus re-orienting the mirror as shown in FIGS. 9 and 10.

FIGS. 11 and 12 illustrate how spot mirror 20 is adjustable to downwardly angled orientations.

FIG. 13 illustrates how spot mirror 20 is adjustable to rightwardly tilted orientations.

Figure 14:
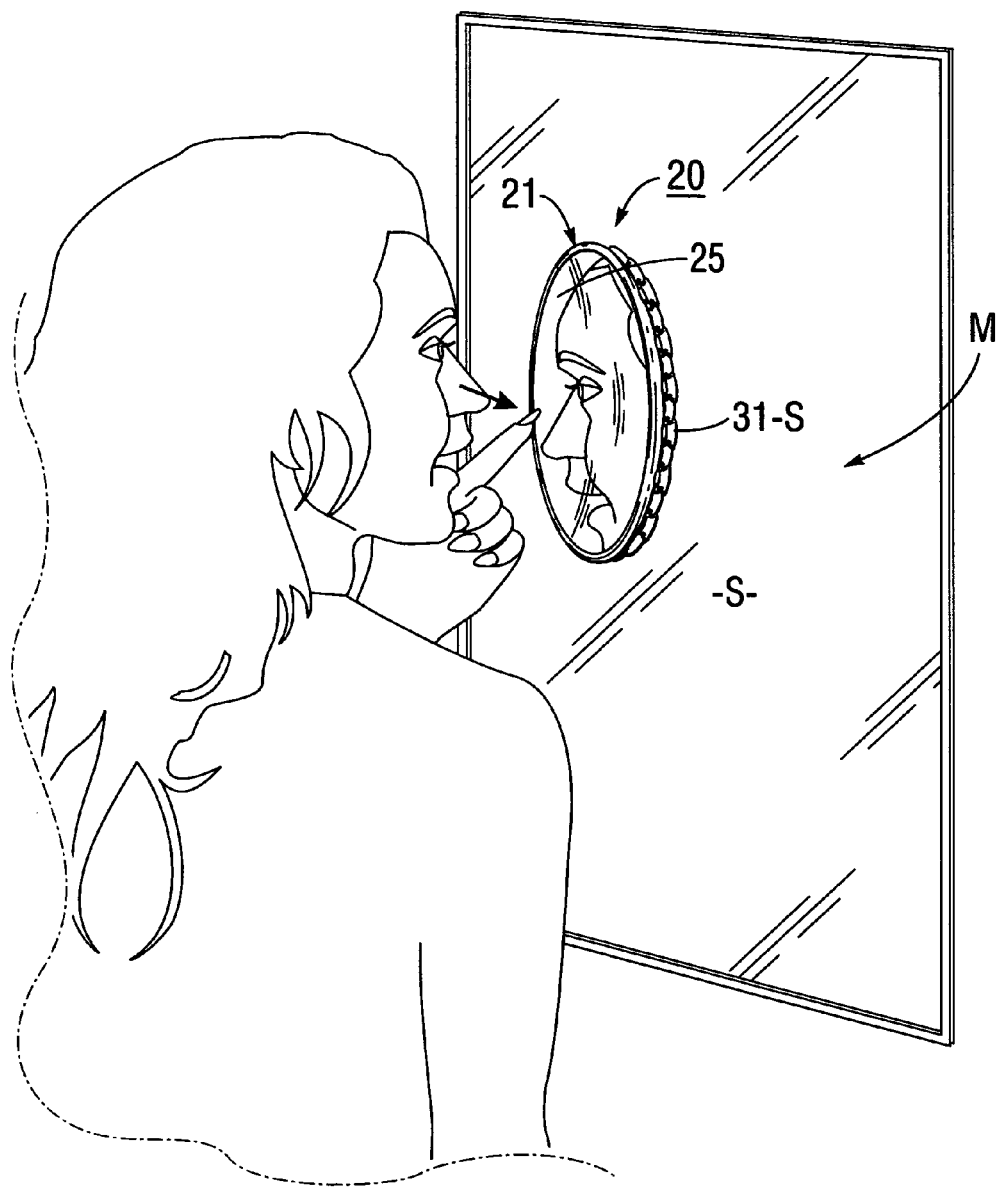
FIG. 14 is a perspective view showing the mirror of FIG. 1 tilted to the left.

FIG. 14 illustrates how finger pressure may be used to adjust spot mirror 20 to a leftward tilted orientation angle relative to the surface S of a larger vertical mirror M, to thus provide a view of the right side of a person's face.

Figure 15:
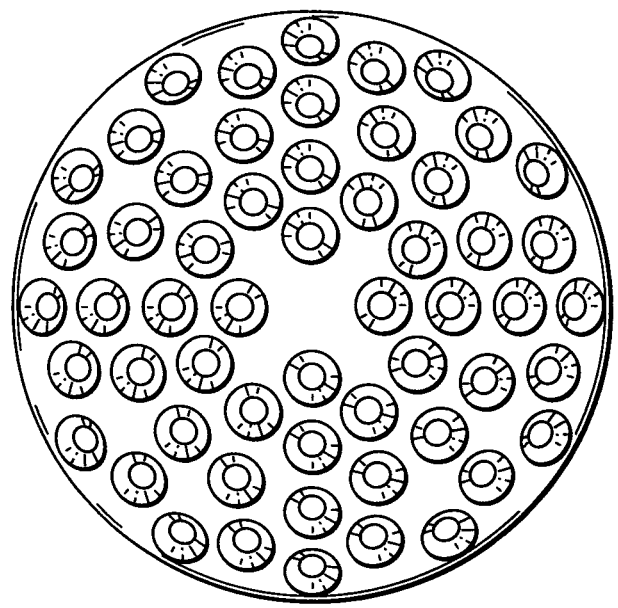
FIG. 15 is a rear elevation view of a modification of the mirror of FIG. 5 which does not have a central suction cup.
Figure 16:
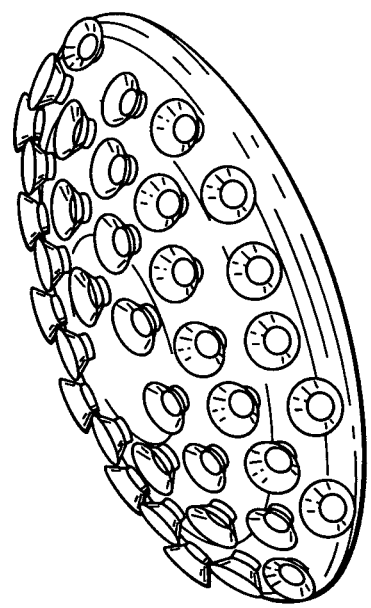
FIG. 16 is a rear perspective view of the modification of FIG. 15.

FIGS. 15 and 16 illustrate a modification 40 of the mirror 20 described above, in which the center suction is eliminated. Modified mirror 40 is attached in parallel alignment to flat supporting surface by pressing on the center of the front surface of the mirror with sufficient force to cause one or more pairs of suction cups 51-S to which are equidistant from the center of the mirror to adhere to a support surface.

In preferred embodiments of mirrors 20 and 40 according to the present invention, body 29 of frame 21 and body 49 of frame 41 are made of an elastomeric material such as rubber, thus cushioning and protecting mirror plate 25 or 45 from breakage in case the mirror is inadvertently dropped.

It should be noted that the thin shape of mirrors 20 and 40 according to the present invention requires a smaller storage space than prior art adjustable mirrors and is thus more economical to store and ship, and more convenient to carry in a purse or similar article. Also, the ease with which the mirror may be easily re-oriented at at different elevation angles to a larger flat mirror without requiring that the mirror be removed and re-attached facilitates its convenient use by members of a typical family unit who have different heights, such as a father, mother and children.

What is claimed:

1. A spot mirror releasably attachable to a flat support surface, at adjustable inclination angles of an optical axis of said mirror relative to the flat support surface, said mirror comprising:
   a. a support body having a convex, arcuately curved rear surface,
   b. a reflective mirror plate attached to a front surface of said body, and
   c. a multiplicity of suction cups protruding rearward from said rear surface of said body, each of said suction cups having a front surface directly attached to the convex, arcuately curved rear surface of the support body and a rear annular sealing surface, wherein the rear annular sealing surfaces of the suction cups lie in a common convex curved plane, whereby selected ones of said suction cups may be pressed into pneumatic sealing adherence against a flat support surface to thereby releasably attach said mirror to said flat surface at selected inclination angles relative to said flat support surface.

2. The spot mirror of claim 1 wherein said multiplicity of said suction cups includes at least one pair of first and second satellite suction cups radially displaced from the center of said support body.

3. The spot mirror of claim 2 wherein said first and second satellite suction cups are spaced apart equal distances from the center of said support body.

4. The spot mirror of claim 2 wherein said second satellite suction cup is diametrically opposed to said first satellite suction cup.

5. The spot mirror of claim 1 wherein said multiplicity of said suction cups is further defined as including a third satellite suction cup spaced apart from said first and second satellite suction cup.

6. The spot mirror of claim 5 wherein said multiplicity of suction cups is further defined as including a fourth satellite suction cup spaced apart from said third satellite suction cup.

7. The spot mirror of claim 6 wherein said first and second satellite suction cups are located on a first line through the center of said support body, on opposite sides thereof.

8. The spot mirror of claim 7 wherein said third and fourth satellite suction cups are located on a second line through the center of said support body, on opposite sides thereof.

9. The mirror of claim 8 wherein said first and second lines are mutually perpendicular.

10. The spot mirror of claim 1 wherein said support body is further defined as having a lenticular shape.

11. The spot mirror of claim 10 wherein said support body is further defined as having circular plan-view shape.

12. The spot mirror of claim 11 wherein said arcuately curved rear surface of said support body is further defined as being substantially a spherical section.

13. The spot mirror of claim 1 wherein said reflective mirror plate is further defined as having a concave reflective surface.

14. The spot mirror of claim 1 wherein each of said suction cups is further defined as having an annular ring-shaped base, and a hollow frusto-conically shaped body which tapers to a smaller diameter stem that is fastened to said rear surface of said support body.

15. The spot mirror of claim 1 wherein each of said suction cups is made of an elastomeric material.

16. The spot mirror of claim 15 wherein said elastomeric material is further defined as being a silicone rubber.

17. The spot mirror of claim 1 wherein said multiplicity of said suction cups includes a center suction cup centrally located on said rear surface of said support body.

18. The spot mirror of claim 17 wherein said multiplicity of said suction cups include at least a first pair of satellite suction cups radially displaced from said center suction cup.

19. The spot mirror of claim 18 wherein said first pair of suction cups are diametrically opposed.

20. The spot mirror of claim 19 further including a second pair of suction cups spaced apart from said first pair of suction cups.

21. A spot mirror releasably attachable to a flat support surface, at adjustable inclination angles relative to the support surface, said mirror comprising,
   a. a support body having a rear surface,
   b. a reflective mirror plate attached to a front surface of said body, and
   c. a multiplicity of suction cups protruding rearward from said rear surface of said body, each of said suction cups having a front surface directly attached to the rear surface of the support body and a rear annular sealing surface, wherein the rear annular sealing surfaces of the suction cups lie in a common convex curved plane spaced rearward of said mirror plate at different distances, whereby said mirror is releasably fastenable to a flat support surface with an optical axis of said mirror coextensive with a perpendicular normal to the center of said reflective mirror plate oriented at adjustable inclination angles relative to said support surface by pressing rear annular sealing surfaces of selected ones of said suction cups into sealing contact with said flat support surface.

22. The mirror of claim 21 wherein said multiplicity of suction cups include at least two pairs of adjacent suction cups spaced at different distances from the center of said reflective mirror plates.

23. The mirror of claim 21 wherein said multiplicity of suction cups includes at least a first pair of first and second opposed suction cups located on a first diameter of said convex curved plane, said first pair of opposed suction cups being located on opposite sides of the center of said convex curved plane.

24. The mirror of claim 23 further including at least a third suction cup adjacent to said first opposed suction cup and a fourth suction cup adjacent to said second opposed suction cup.

25. The mirror of claim 23 wherein said multiplicity of suction cups includes at least a second pair of opposed suction cups located on a second diameter of said convex curved plane, said second pair of opposed suction cups being located on opposite sides of the center of said convex curved plate.

26. The mirror of claim 25 where each of said opposed suction cups lying on said first diameter and each of said opposed suction cups lying on said second diameter has at least one adjacent suction cup lying on said first and second diameters, respectively.

* * * * *